Jan. 14, 1958 D. H. MacPHERSON ET AL 2,820,104

SENDER LOAD CONTROL

Filed Sept. 14, 1954 6 Sheets-Sheet 1

INVENTORS D. H. MACPHERSON
C. H. MC CANDLESS
J. B. NEWSOM

BY C. Mattice

ATTORNEY

SENDER LOAD CONTROL

Filed Sept. 14, 1954 6 Sheets-Sheet 2

INVENTORS D. H. MAC PHERSON
C. H. MC CANDLESS
J. B. NEWSOM
BY C. Mathie
ATTORNEY Jan. 14, 1958 D. H. MacPHERSON ET AL 2,820,104

SENDER LOAD CONTROL

Filed Sept. 14, 1954 6 Sheets-Sheet 3

INVENTORS D. H. MAC PHERSON
C. H. MC CANDLESS
J. B. NEWSOM

BY C. Mathue

ATTORNEY

INVENTORS D. H. MAC PHERSON
C. H. MC CANDLESS
J. B. NEWSOM

BY C. Mathers

ATTORNEY

Jan. 14, 1958 D. H. MacPHERSON ET AL 2,820,104

SENDER LOAD CONTROL

Filed Sept. 14, 1954 6 Sheets-Sheet 5

INVENTORS D. H. MACPHERSON
C. H. MC CANDLESS
J. B. NEWSOM

BY C. Mathie

ATTORNEY

INVENTORS D. H. MAC PHERSON
C. H. MC CANDLESS
J. B. NEWSOM
BY C. Mattice

United States Patent Office 2,820,104
Patented Jan. 14, 1958

2,820,104

SENDER LOAD CONTROL

Donald H. MacPherson, Freeport, Clarence H. McCandless, Garden City, and James B. Newsom, Great Neck, N. Y., assignors to Bell Telephone Laboratories, Incorporated, New York, N. Y., a corporation of New York Application September 14, 1954, Serial No. 455,844

7 Claims. (Cl. 179—22)

This invention relates to telephone systems and has for one of its objects the provision of equipment to minimize the effect of exceptionally heavy traffic conditions.

In telephone systems the maximum number of calls which can be handled is limited by the quantity of equipment provided at the central office and this quantity is based on the estimated number of calls to be expected. The number of calls to be handled naturally varies from day to day and from hour to hour and the amount of equipment which will usually serve a period of light traffic may be heavily overloaded during the busy hours. Similarly the amount of equipment which will serve a normally busy hour will be overloaded during the special traffic which occurs on such days as Christmas or Mother's Day. It would be very uneconomical to supply sufficient equipment to handle such holiday traffic without delay since, for the greater part of the year, much of it would stand idle.

In accordance with the present invention means is provided to minimize the delays which result from traffic overloads and also to prevent a heavy load in one or more offices from adversely affecting all other offices. This means is particularly designed for use in such toll telephone systems as those disclosed in Patent 2,236,246 to King-McKim-Myers, March 25, 1941, and the application of Gooderham-Jacobitti-Myers-Shipley-Strickler, Serial Number 286,267, filed May 6, 1952.

These systems employ large numbers of trunk circuits which are served by incoming senders for the purpose of registering line designations and controlling the establishment of telephone connections including the trunk circuits. Link circuits each comprising a set of primary and secondary crossbar switches are provided for connecting the incoming trunks to the incoming senders. The connection between the trunk and the incoming sender set up over these switches is maintained while the destination code and other information is registered, the outgoing trunk is selected and connected with the incoming trunk and all or a part of the designation is transmitted to a distant office. On the other hand, the operations necessary for identifying the incoming trunk, finding an idle sender and operating the link switches usually require only a brief interval. Therefore, instead of providing equipment to perform these latter functions on each sender link frame, they have been incorporated in a small number of link controller circuits. Each sender link frame has an individual sender link circuit which has access to two out of a plurality of controller-connectors, which may be used alternately to connect the link circuit with one of the plurality of link controller circuits. Under heavy traffic conditions, when many senders are busy the link controller circuit repeatedly tests the senders by groups for a measured interval of time, and, if no sender is found within that time interval, the link controller circuit is released and another link controller circuit is seized which also tests for an idle sender for a measured time.

In accordance with a feature of the present invention when all of the senders of a group serving a particular sender link frame are busy the link circuit of that frame is prevented from attempting to seize a link controller circuit. Therefore the link controllers are not permitted to make a long futile search for an idle sender but are free to serve sender link frames for which senders are available. In addition, as senders become idle, each sender link frame thus served is prevented from seizing another link controller circuit as long as calls are waiting in some other link frame, thereby distributing the service as equitable as possible over the link frames.

Whenever an incoming call reaches an incoming trunk, that trunk operates a start relay in the associated link circuit. If either or both of the two controller connectors serving the link circuit is idle the start relay operates a seizing relay associated either with the preferred controller-connector or with the idle controller-connector. The controller-connector then functions to select and connect with an idle link controller end, when the connection has been established, operates a lockout relay which indicates that the link circuit is being served and opens the circuit of the seizing relay so that, when the seizing relay is released, following the establishment of one or more sender link connections, it can not be reoperated in response to additional incoming calls. This lockout relay is held operated as long as other sender link circuits served by the same controller-connector are waiting to be served.

In accordance with one aspect of the present invention, when all of the senders serving one or more sender link frames are busy, a relay is operated in each of the corresponding sender link circuits which opens the circuits of the associated seizing relays, and, in addition, means is associated with each controller-connector which provides a supplementary locking circuit for the lockout relays of the sender link circuits for which no idle senders are available as long as unserved calls are waiting in other sender link circuits for which idle senders are available. As senders become available to the sender link circuits, the supplementary locking circuits for the lockout relays of such sender link circuits are opened.

These and other features of the invention will be more clearly understood from a consideration of the following description read in connection with the drawing in which:

Fig. 1 shows the link switches by which any one of a group of trunks may be connected with any one of a group of senders;

Fig. 7 shows the manner in which Figs. 1 to 6 are to be arranged.

GENERAL OPERATION

Figures 1, 7:
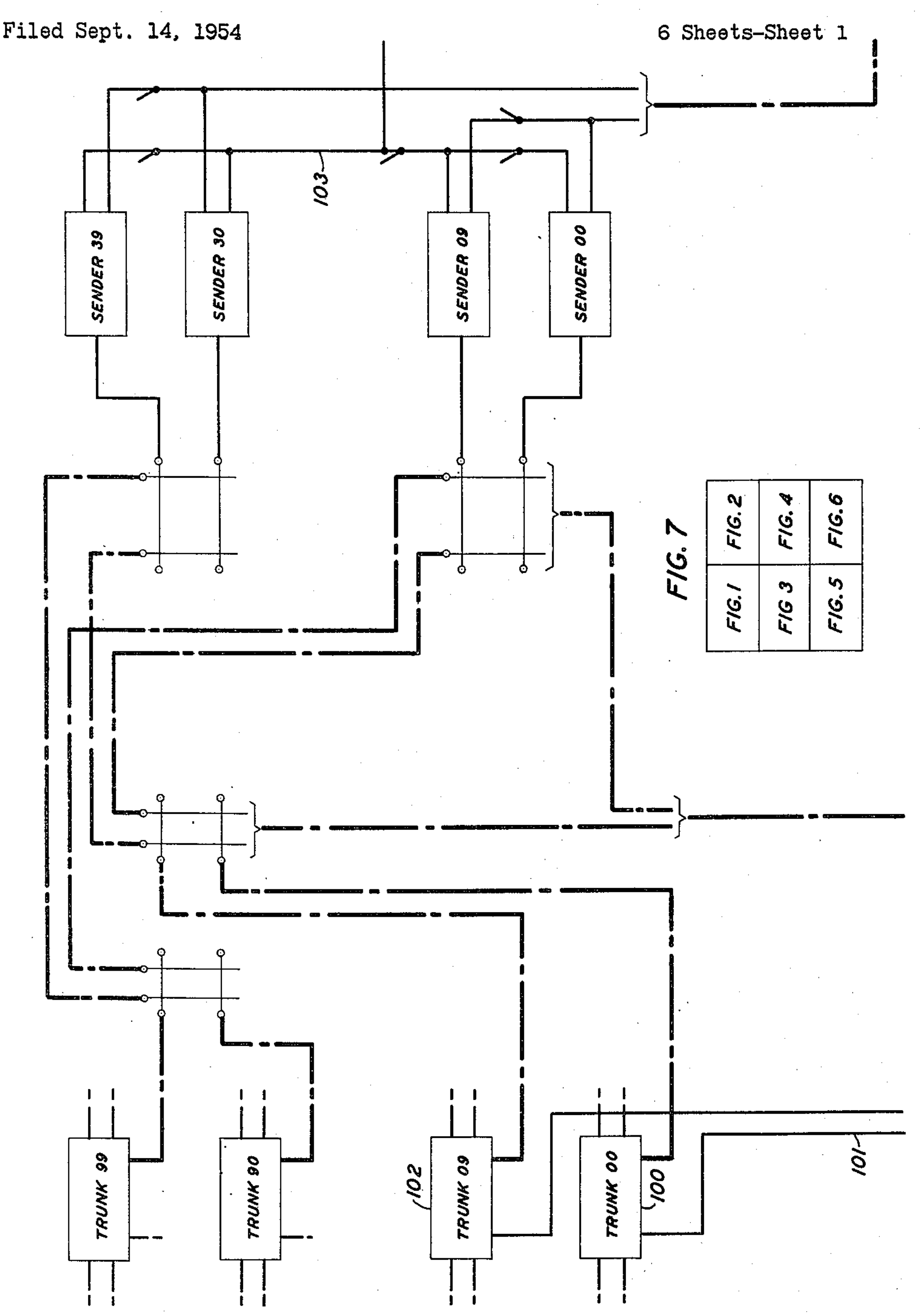

As disclosed in the above-identified King et al. patent, the sender link frame includes 10 primary switches to which 100 incoming trunks are connected in groups of 10, and 4 secondary switches to which 40 incoming senders are attached, also in groups of 10, with suitable links for connecting the primary and secondary switches. Each sender link frame is served by a sender link circuit which includes a group start relay for each group of 10 trunks. In response to the operation of a group start relay, one of two controller-connectors is operated to connect the sender link circuit with a link controller. With the controller-connector operated, all of the group start leads are extended to the link controller circuit, together with a set of individual start leads, as well as test leads for testing the senders serving a sender link frame and control circuits for operating the primary and secondary select magnets and hold magnets of the link crossbar switches. The link controller identifies a trunk group and an individual trunk, selects an idle sender, operates the link switches to connect the incoming trunk with the selected sender and then releases.

If a plurality of trunks on one sender link frame receive calls at the same time, the link controller sets up the required connections for each of the trunks in the trunk group and then sets up the required connections for the trunks of other groups in turn. When all of the trunks have been served the link controller releases, in turn releasing the controller-connector and the sender link frame. If so many trunks are calling for senders that all of the connections requested by one sender link frame can not be completed within a predetermined time, timing means in the link controller releases the link circuit from the controller so that the controller may serve other sender link frames.

*Detailed operation*

When a call reaches any one of a group of ten trunks including trunks 00 to 09, for example trunk 100, the trunk circuit functions to close the start circuit for the sender link circuit by connecting ground to start conductor 101 extending to the link circuit individual to the frame on which trunk 100 appears. Conductor 101 is connected over contact 2 of relay 300 to battery through the winding of start relay 301. Other trunks of this group, such as trunk 102, ground individual start conductors which extend over other back contacts of relay 300 to the winding of start relay 301. Other groups of ten trunks are served by other gate relays like relay 300 and other start relays like relay 301.

When relay 301 operates, it prepares two circuits for seizing a link controller-connector. One of these connector seizing circuits is completed as determined by the operated or released condition of preference relay 302, the operation of which will be described hereinafter. Assuming that relay 302 is not operated, the circuit from battery through resistance 303 closed over contact 1 of relay 301, extends over contact 1 of relay 304, contact 1 of relay 305, contact 1 of relay 302, to ground. The the circuit from battery through resistance 306 closed over contact 2 of relay 301, extends over contact 3 of relay 304, contact 3 of relay 305, contact 3 of relay 302, conductor 307, contact 3 of relay 500, contact 1 of relay 501, conductor 502, contact 1 of relay 610, conductor 650, contact 5 of relay 400, conductor 401, winding of relay 600, to ground. Relays 600 and 610 are indivdual to the link circuit serving trunk 00 to trunk 99, relay 600 forming part of a chain circuit including similar relays for all of the link circuits having access to the same controller-connector. If relay 600 is the last relay of the chain its winding is connected directly to ground but, if it is an intermediate or first relay of the chain it receives ground over normally closed contacts of other similar relays so that relay 600 can operate only if none of the earlier relays of the chain are operated.

Assuming that the circuit of relay 600 is complete, relay 600 operates and locks in a circuit from ground over its contact 1, winding of relay 600, contact 4 of relay 600 to battery connected to conductor 502 as abovetraced. With relay 600 operated, a circuit is closed from battery through resistance 651, contact 7 of relay 600, conductor 652 to ground through the winding of multicontact relay 503. This relay, which represents a plurality of relays sufficient to control the required number of contacts, operates and closes a plurality of control conductors through to the contacts of the connector relay in the controller-connector.

Relay 600 also closes a circuit from battery through resistance 653, contact 9 of relay 600, conductor 654, winding of relay 504 to ground. Relay 504 operates in this circuit and initiates the seizure of an idle link controller circuit. Each controller-connector has access to all of the link controller circuits. There is a seizing relay such as relay 620 and a controller busy relay such as relay 630 individual to each controller in each of the controller-connector circuits. The relays 620, 621, etc. in each controller-connector circuit are arranged in a preference chain and the chain circuits are arranged to give different controller-connectors preference for different controller circuits. Whenever a controller is busy, circuits are closed for operating the corresponding relays 630, 631, etc. in each controller-connector.

Assuming that the number 0 link controller 640 is idle and that the selected controller-connector prefers that link controller, the operation of relay 504 closes a circuit from battery through resistance 505, contact of relay 504, conductor 506, contact 1 of relay 630, winding of relay 620 to ground. Relay 620 operates and closes a circuit from ground over its contact 2 and conductor 655 to battery through the winding of multicontact relay 507 which completes the connection of the control conductors to the link controller 640. Relay 507 also represents a number of relays sufficient to close the required number of contacts. Link controller 640 closes circuits for operating all of the controller busy relays individual thereto, including relay 630, but relay 507 in operating connects ground over its contact 6 to conductor 656 in shunt of the winding of relay 630 to prevent the operation of relay 630 and thereby to prevent the release of relay 620. As soon as relay 507 operates, battery on conductor 514 is extended over contact 2 of relay 507, contact 5 of relay 503, conductor 522, to ground through the winding of relay 313, operating relay 313.

The link controller functions, as described in the above-identified King et al. patent, to identify a particular group of trunks in which the trunk desiring service is located, after which it operates group relay 308 to extend the individual trunk start conductors to the link controller and later operates relay 300 to open the multiple connection between these start conductors and the winding of the link start relay 301. The link controller then identifies the individual trunk to be served, tests for an idle sender and controls the operation of the link switches to connect the incoming trunk to the selected sender.

When relay 308 operates, it closes at its contact 2 a path in parallel with contact 2 of relay 301 so that relay 600 remains operated after relay 301 is released.

When the link controller has served all of the trunks whose start circuits have been extended to the link controller, or when the link controller times out, battery is disconnected from the conductor 514, causing relay 313 to release, and battery is connected to conductor 515. When relay 313 releases a circuit is closed from ground over contact 4 of relay 313, conductor 327, winding of relay 501, contact 4 of relay 503, contact 3 of relay 507, to battery on conductor 515 causing relay 501 to operate and open the locking circuit for relay 600, thereby causing relays 600, 503 and 504 to release, releasing the controller-connector and releasing relay 620 to disconnect this controller-connector from the link controller circuit.

When the multicontact relay 507 of the controller-connector operates as above described, it closes an obvious circuit for operating relay 513 which in turn operates relay 512. With relay 512 operated, ground is connected to each of the link circuits having access to this controller-connector circuit to mark the controller-connector busy. One of these circuits may be traced from ground over contact 1 of relay 512, conductor 518, through the upper winding of relay 500. In the link circuit with which the controller-connector is working this circuit is ineffective, since the multicontact relay 503 of that link circuit is operated, but in all other link circuits the circuit through the upper winding of relay 500 extends to battery over the back contact of the associated multicontact relay like relay 503 and the relay like relay 500 is operated. In a similar manner relay 508 is operated if its associated second controller-connector is busy. With relay 500 operated, the operating circuit for relay 600 is opened which prevents the link circuit from attempting to seize the associated first controller-connector. In a similar manner, relay 508 prevents the operation of the relay corresponding to relay 600 associated with the second controller-connector.

If the preference circuit is set to prefer the first controller-connector and that connector is busy as indicated by the operation of relay 500, the circuit previously traced for operating relay 600 extends as before to conductor 307 and thence over contact 4 of relay 500, contact 2 of relay 508, contact 1 of relay 509, to conductor 510 to operate a corresponding relay associated with the second controller-connector.

The preference relays 302 and 317 are controlled in normal operation by relay 313 which is operated from battery supplied to conductor 514 from the link controller whenever relays 503 and 507 are operated to connect the link controller to the link circuit as above described.

Assuming, that the preference relays are not operated, when relay 313 operates, a circuit is closed from ground over contact 2 of relay 313, contact 4 of relay 325, conductor 402, contact 1 and winding of relay 317 to battery through resistance 318. Relay 317 operates in this circuit and locks to ground over its contact 2, at the same time closing a circuit from ground over its contact 2 through the winding of relay 302 to battery through resistance 319. However, relay 302 does not operate in this circuit, since its winding is shunted by ground on conductor 402 over its contact 6. When relay 313 releases, following the release of the link circuit, ground is removed from conductor 402 and the shunt around the winding of relay 302 is opened and that relay operates.

With relay 302 operated, the circuit previously traced for energizing relay 600 is opened and the circuit closed over contact 1 of relay 301 to the upper armature of relay 302 is extended over conductor 320, contact 3 of relay 508 and contact 1 of relay 509 to conductor 510 to prepare to operate the relay individual to this link circuit in the chain circuit associated with the second controller-connector for the next call. When relay 313 operates during the next call, it again connects ground to conductor 402 completing a circuit over contact 5 of relay 302 to battery through resistance 318 in shunt of the winding of relay 317, causing relay 317 to release. With relay 317 released, the operating circuit for relay 312 is opened but that relay is held operated over contact 1 of relay 317, contact 5 of relay 302 and conductor 402 until relay 313 releases, when relay 302 also releases. With relay 302 released, the circuit for seizing the second controller-connector is opened and the previously traced circuit for operating relay 600 to seize the first controller-connector is reclosed. Therefore the preference between the first and second controller-connectors alternates with each successive operation of the controller-connector.

The link circuit is also provided with a timing circuit for controlling the change of preference. Relay 301 in operating closes an obvious circuit for operating relay 309 to start this timing operation. Relay 309 at its contact 2 connects the lower winding of relay 310 to conductor 311 leading toward the first controller-connector serving this link circuit and at its contact 1 connects the upper winding of relay 310 to conductor 312 leading toward the second controller-connector serving the link circuit. In the first controller-connector conductor 311 extends over the back contacts of unoperated controller busy relays 630, 631, etc. to ground in the associated idle link controllers 640, 641, etc. If any of the link controllers is idle, ground will appear on conductor 311 or 312 and relay 310 will be operated. With relay 310 operated, ground is connected over contact 1 of relay 310, contact 1 of relay 313 to the armature of interrupter 314. As soon as the interrupter closes its contact 2 it completes a circuit for relay 315 which operates and locks over its contact 1 independent of the interrupter. If a link controller has not been found and connected with the link circuit as indicated by the release of relays 301 and 309 before interrupter 314 closes its contact 1, a circuit is closed from ground as above traced over contact 2 of relay 315, conductor 316, contact 1 of relay 400 to conductor 402 to operate relay 317.

When interrupter 314 opens its contact 1, relay 302 operates. If relay 301 has not been released when interrupter 314 again closes its contact 1 ground is connected as above traced to conductor 402 to release relay 317 followed by relay 302 as above-described.

Relay 310 also connects ground over its contact 2, conductor 321 over contact 1 of relay 500 or over contact 1 of relay 508, conductor 511, contact 6 of relay 313, conductor 322, contact 2 of relay 400, conductor 403 to the armature of interrupter 323. This interrupter in closing its contact 2 operates relay 324 which locks to ground on conductor 403. When interrupter 323 closes its contact 1, approximately one second later, it connects ground on conductor 403 over contact 2 of relay 324 to battery through the lower winding of alarm relay 325. Relay 325 operates and locks over its contact 3 under the control of the alarm release key 326 and at its contact 1 connects ground to alarm conductor 332 to cause an alarm to be sounded.

It will be noted that the circuit for grounding alarm interrupter 323 extends over back contacts of relays 500 and 508 so that, if neither of the controller-connectors is available, ground can not be connected to the armature of interrupter 323 and the alarm timing does not become effective until at least one of the controller-connectors is idle.

Relays 304 and 305 are supplied to force the use of one or the other controller-connector in case trouble is found on one of the connectors. These relays are operated under key control. With relay 304 operated, ground is connected to the start circuit for the second controller-connector while the start circuit for the first controller-connector is extended over contact 4 of relay 304, conductor 331, contact 2 of relay 500 and contact 1 of relay 501 to conductor 502 and the operating circuit for relay 600. Ground is also connected over conductor 333 to operate relay 508 to mark the second controller-connector busy. Relay 305 performs similar functions with the second controller-connector.

*Traffic control*

Figure 2:
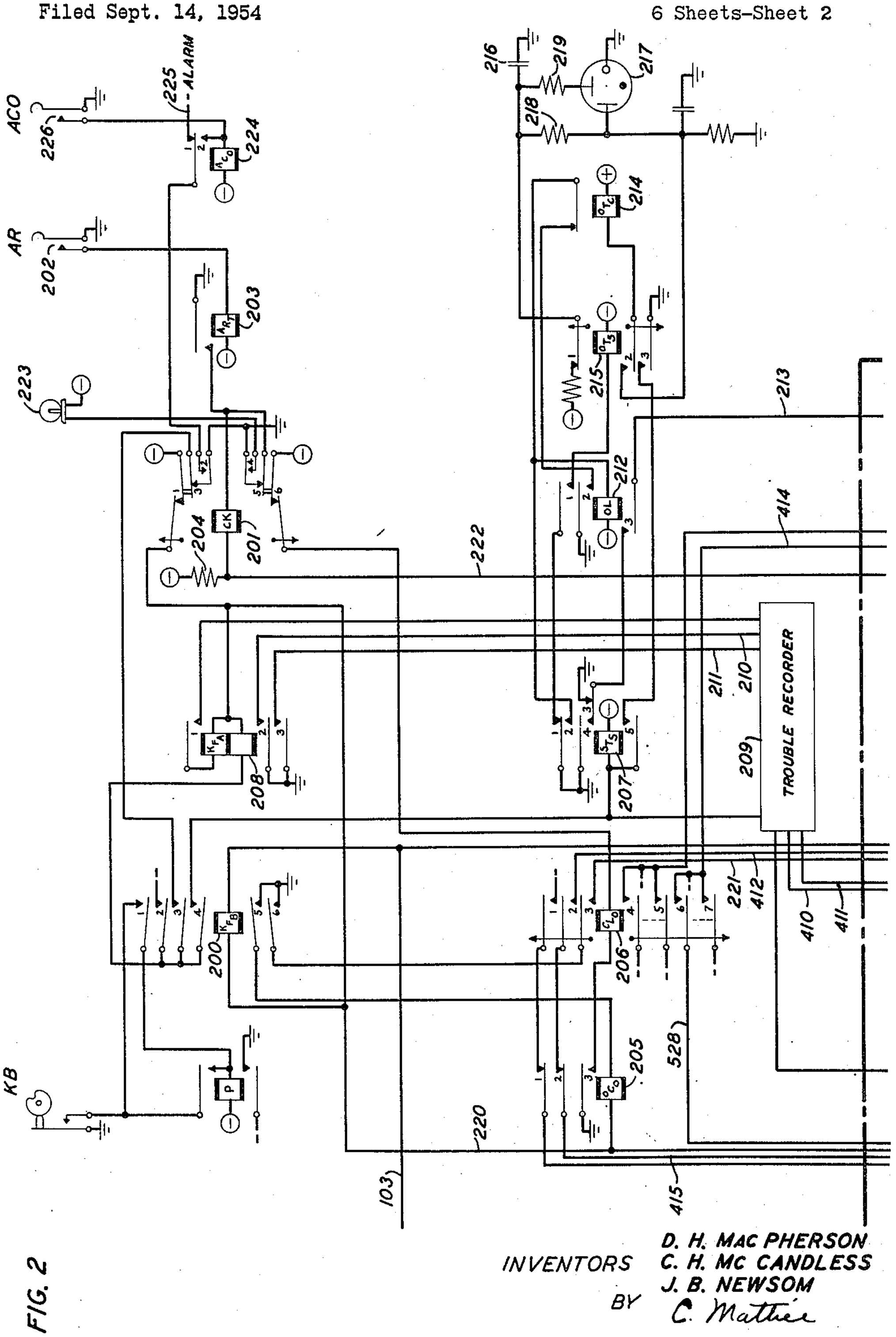
Fig. 2 shows a part of the sender traffic control circuit.
Figure 3:
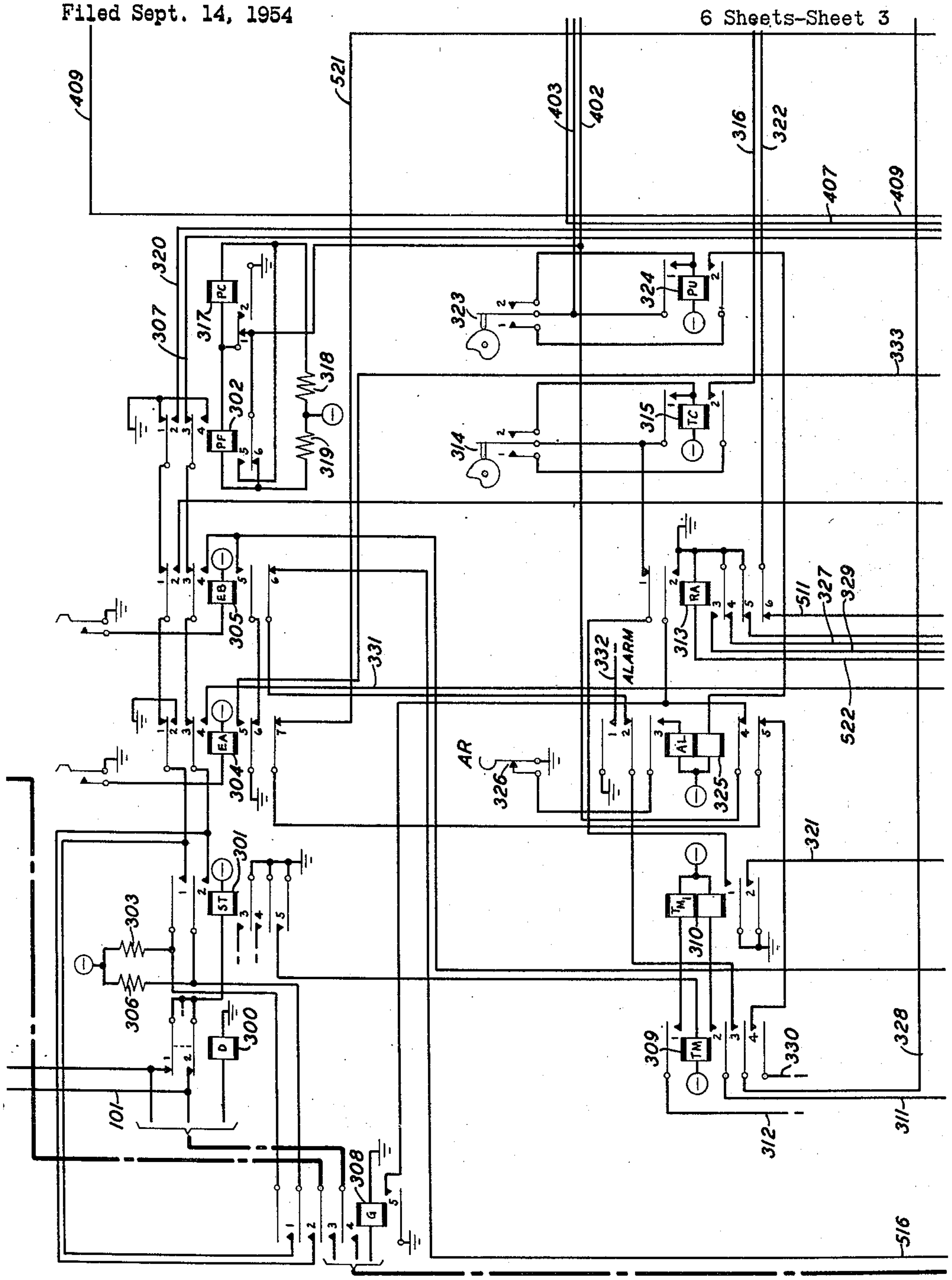
Fig. 3 shows a part of a sender link circuit.
Figure 4:
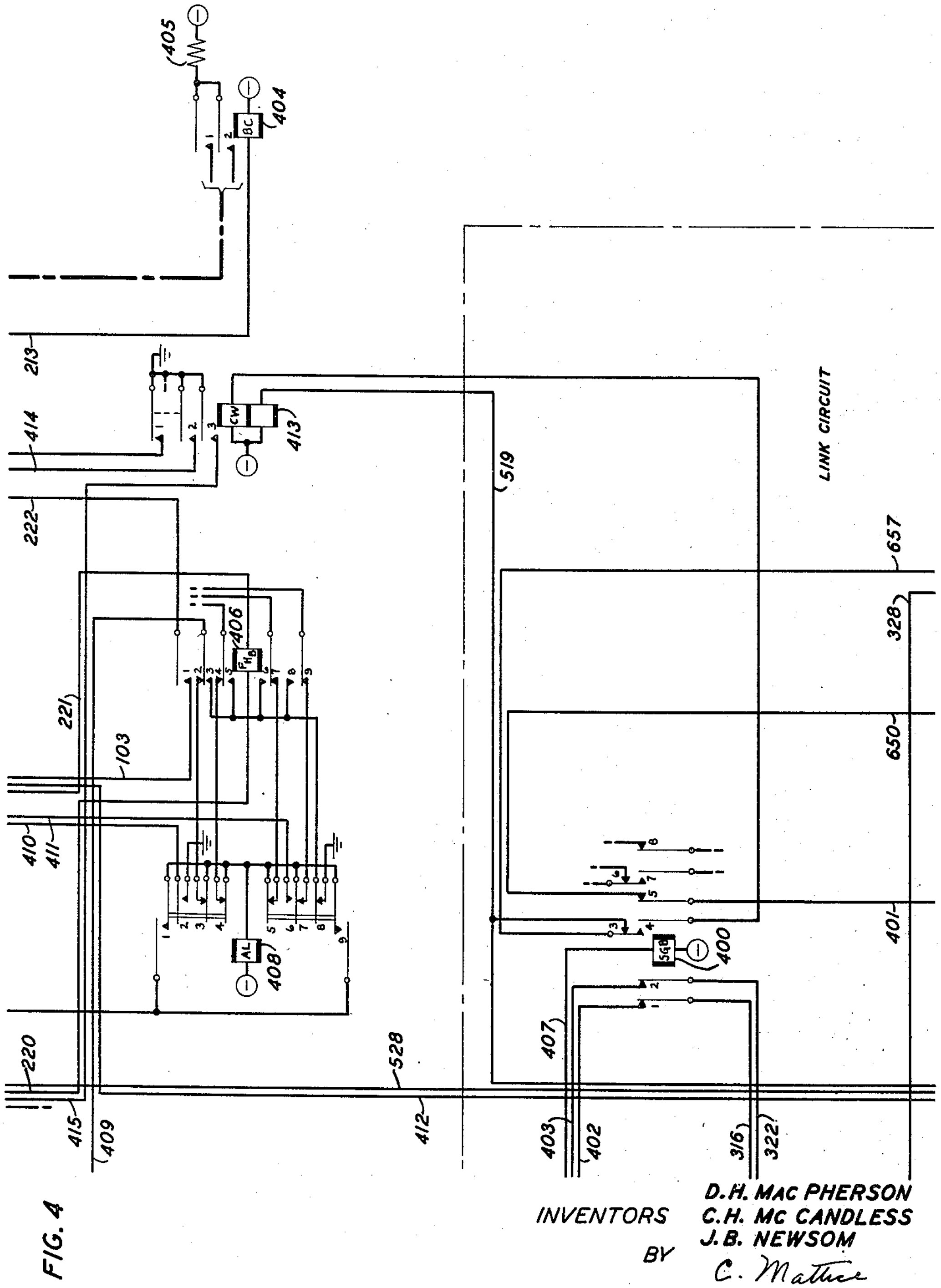
Fig. 4 shows an additional part of the sender traffic control circuit and the all-sanders busy relay associated with the sender link circuit of Figs. 3 and 5.
Figure 5:
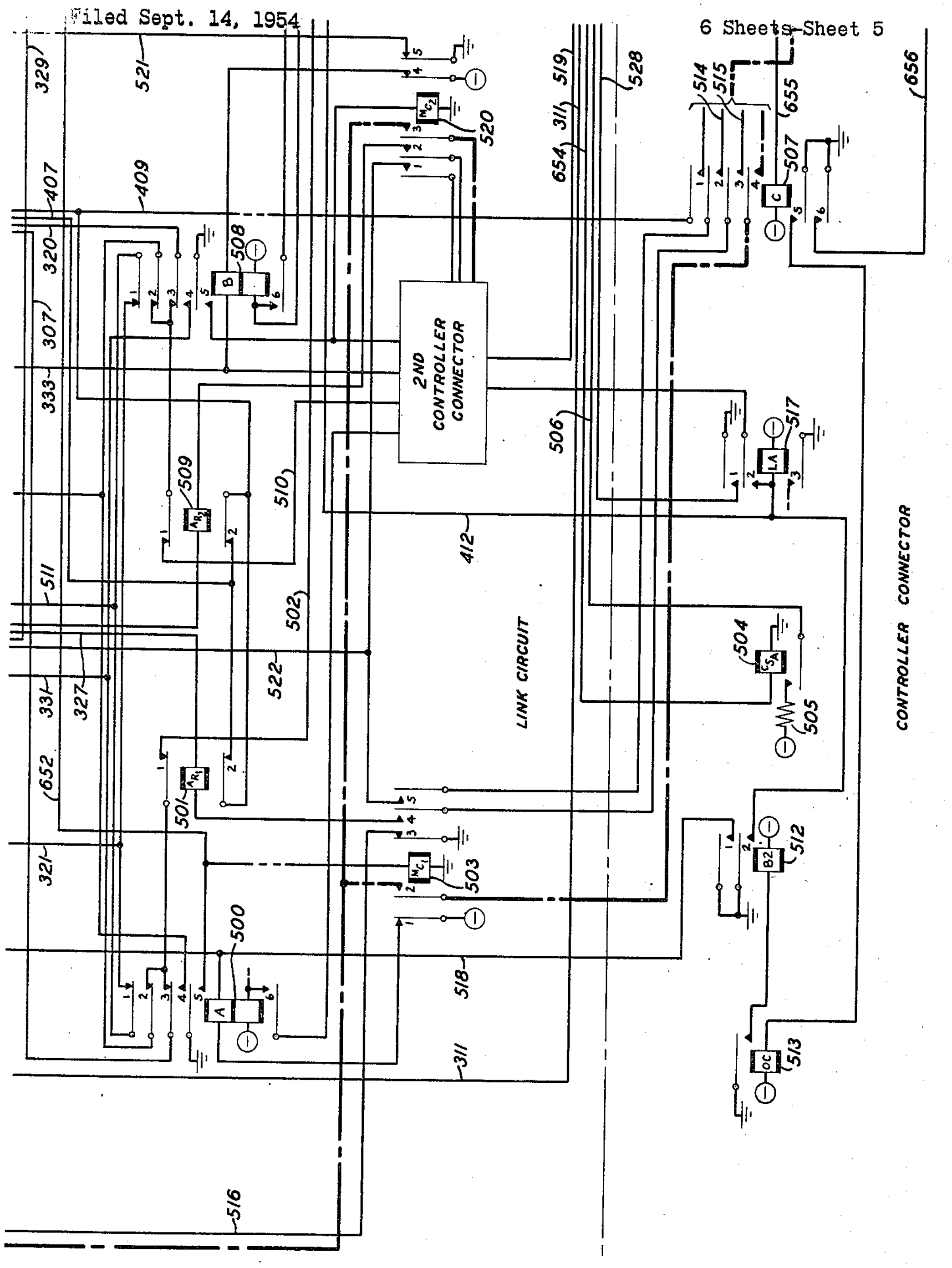
Fig. 5 shows an additional part of the sender link circuit and a part of a controller-connector.
Figure 6:
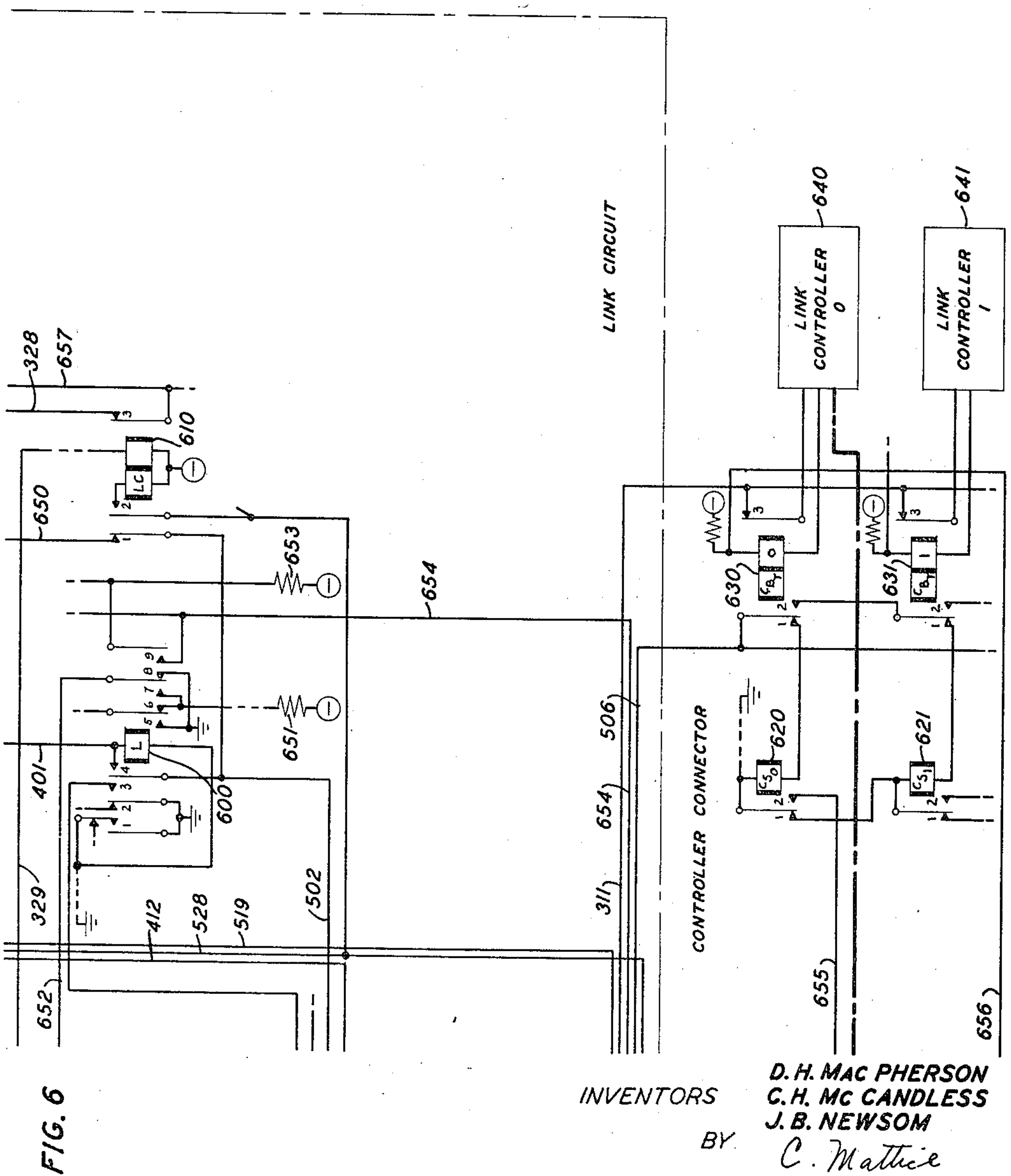
Fig. 6 shows the preference relays for controlling the connection of the sender link circuit of Figs. 3 and 5 with the controller-connector of Fig. 5 and the preference relays for connecting the controller-connector of Fig. 5 to a sender link controller.

The traffic control circuit of Fig. 2 and the upper part of Fig. 4 is individual to the group of senders serving the sender link frame of Fig. 1. Whenever anyone of the senders of the group appearing on the link frame of Fig. 1 is idle it holds ground connected to conductor 103 and the winding of relay 200. Relay 201 is normally operated, being reoperated, whenever released as described hereinafter, under manual control in response to the operation of key 202 which operates relay 203 and closes a circuit from ground over the contact of relay 203 through the winding of relay 201 to battery through resistance 204. Relay 201 operates and locks over its contact 5 to ground. With relay 201 operated, a circuit is closed for relay 200 from ground on conductor 103 through the winding of relay 200, conductor 220 to battery over contact 1 of relay 201, whereby relay 200 remains operated as long as one of the senders of Fig. 1 remains idle.

If all of the senders of Fig. 1 become busy, ground is removed from conductor 103 and relay 200 releases to initiate a number of traffic control features. To this end a circuit is closed from ground over contact 5 of relay 200, through the winding of relay 205 to battery on conductor 220, operating relay 205. With relay 205 operated, a circuit is closed from ground over contact 3 of relay 205 through the winding of relay 206 to battery over contact 6 of relay 201 causing relay 206 to operate. In addition, a circuit is closed from ground over contact 3 of relay 201, contacts 3 and 4 of relay 200 to battery through the winding of relay 207. Furthermore a circuit is closed from ground over contact 3 of relay 201 and contact 3 of relay 200 through the lower winding of relay 208 to battery on conductor 220. Relay 208 operates in this circuit and locks over its contact 1 under the control of the trouble recorder circuit 209, at the same time grounding conductors 210 and 211 to light a lamp at the trouble recorder frame and to identify the frame served by the busy senders and the type of the sender.

With relay 207 operated, ground is connected over its contact 2 to battery through the winding of relay 212, which operates and locks over the back contact of relay 214 to ground at contact 2 of relay 212. Relay 212 also closes a circuit from ground over contact 4 of relay 207, contact 3 of relay 212, conductor 213 to battery through the winding of relay 404. Relay 404 operates and connects battery through resistance 405 to conductors leading to each of the senders of Fig. 1 to limit the time that the senders wait for response from a distant office. The operation of the sender in response to this signal is described in the application of Gorgas-Jacobitti-Jaeger-Morrison-Newsom, Serial No. 455,822, filed September 14, 1954, concurrently with the present application.

When the all-senders busy condition terminates and relay 200 reoperates, relay 207 releases but relay 404 is held operated over contact 3 of relay 207. With relay 207 released and relay 212 locked operated, a circuit is closed from ground over contact 1 of relay 207, contact 1 of relay 212, to battery through the winding of relay 215. Relay 215 initiates a timing interval to delay removal of the timing limitation from the senders. At its contact 1, relay 215 disconnects negative battery from condenser 216, and, at its contact 2, connects +130-volt battery through the winding of relay 214 to the main anode of tube 217 and through resistance 218 to condenser 216. Condenser 216, which is connected through resistance 219 to the control anode of tube 217, charges from this positive battery. When the breakdown potential of tube 217 is reached, the tube becomes conducting and relay 214 operates across the main gap of tube 217. Relay 214 in operating opens the locking circuit of relay 212 which releases, opening the operating circuit for relay 215 which releases slowly. With relay 215 released, negative battery is again connected to condenser 216, the circuit of relay 214 is opened and tube 217 is quenched. Relay 215 is made slow to release so that, if relay 207 is reoperated relay 215 will not immediately release. Relay 215, at its contact 3 closes a locking circuit for relay 207 to minimize the possibility of pumping between relays 207 and 215 as one or more senders become idle and are reseized. Relay 207 may also be operated under manual control from the trouble recorder frame 209, if desired, during periods of heavy traffic. When relay 212 releases, it releases relay 404 to disconnect battery from the senders on the frame of Fig. 1 to remove the limitation on intersender timing.

When relay 206 operates, as described above, a circuit is closed from ground over contact 6 of relay 200, contact 3 of relay 206, conductor 221, winding of relay 406 to battery on conductor 220. The function of relay 406 is to hold back calls on the sender frames served by the group of senders all of which are busy. With relay 406 operated, ground is connected over contact 8 of relay 408, contact 3 of relay 406 to conductor 409 and over other contacts of relay 406 to other conductors leading to other link frame circuits served by this busy group of senders. If the link circuit is idle, or when it becomes idle, ground on conductor 409 is extended over contact 2 of relay 501 or over contact 2 of relay 509, conductor 407 to battery through the winding of all-senders busy relay 400. Relay 400 operates and at its contact 1 opens the circuit for controlling the preference relays 302 and 317 by interrupter 314 and at its contact 2 disconnects ground from the timing interrupter 323. At its contact 5, relay 400 opens the operating circuit for relay 600, thereby preventing the link circuit from attempting to seize the first controller-connector. At its contact 8 relay 400 also opens the circuit (not shown) for operating the corresponding seizing relay for the second controller-connector. Since the link frames, whose associated senders are all busy, cannot seize controller-connectors, the controller-connectors and all of the link controller circuits are free to handle calls on link frames having idle senders.

If the group of senders becomes busy after a link circuit has been connected to a link controller, a branch of conductor 409 extends through the controller-connector to the link controller circuit to indicate that the connection can not be set up because all of the senders, serving the link circuit which has been connected with the link controller, are busy.

In addition, relay 406 connects battery through resistance 204 over conductor 222, contact 1 of relay 406 to conductor 103 so that, if relay 406 is falsely operated while there are idle senders, as indicated by ground on conductor 103, the winding of relay 201 will be shunted and that relay will be released to disable the traffic control circuit. With relay 201 released, ground is connected over contact 4 of relay 201 to light lamp 223 and over contact 2 of relay 201 and contact 1 of relay 224 to conductor 225 to operate an alarm. The alarm may be silenced by operating key 226 which operates relay 224, disconnecting ground from conductor 225, but relay 224 remains locked over its contact 2 to ground over contact 2 of relay 201. When the trouble has been corrected, the traffic control circuit may be re-enabled by operating key 202 as above described.

Relay 408 is used to provide a standing test for false ground on the operating circuits of the all-senders busy relays such as relay 400. If a ground occurs on any of these operating circuits at a time when the corresponding relay 406 is not operated, for example on conductor 409, a circuit is closed from ground on conductor 409, contact 2 of relay 406, contact 3 of relay 408, to battery through the winding of relay 408. Relay 408 operates and locks over its contacts 1 and 9 under the control of the trouble recorder frame and grounds conductors 411 and 410 to bring in an alarm and to cause a trouble record to be made. The operation of relay 408 disconnects conductor 409 from the other conductors over which associated all-senders busy relays are operated and thereby reduces the number of frames held out of service because of the false ground.

Means is also provided for locking out link circuits as they are served until all other frames have been served.

In order to distribute the traffic between the individual sender link circuits or frames and the link controllers, a preference lockout circuit is provided. When a call reaches the link circuit, start relay 301 is operated, in turn operating relay 309 as previously described. While the link circuit is waiting for a controller-connector a calls-waiting circuit is closed individual to each of the controller-connectors serving this link circuit. The first circuit may be traced from ground over contact 3 of multicontact relay 503, conductor 516, contact 6 of relay 305, contact 2 of relay 325, contact 3 of relay 309, conductor 328, contact 3 of relay 610, which is not operated since the link has not been served, conductor 657, contact 3 of relay 400, conductor 519 to battery through the lower winding of calls-waiting relay 413. A similar circuit is closed from ground over the back contact of the multicontact relay 520 associated with the second controller-connector, conductor 521, contact 7 of relay 304, contact 5 of relay 325, contact 4 of relay 309 to conductor 330 which extends over the back contact of the relay like relay 610 associated with the second controller-connector and over contact 6 of relay 400 to the winding of a calls-waiting relay associated with the second controller-connector.

The operating circuit for the calls-waiting relay 413 not only extends to ground as above traced over the back contact (contact 3) of relay 610 but extends in multiple over back contacts of all of the relays like relay 610 associated with the same controller-connector to ground in those link circuits where an incoming call has caused the operation of a relay like relay 309 and the call has not been served. When all of the relays like relay 610 have been operated to indicate that the call or calls in the associated link circuit are being served, or none of the link circuits associated with an unoperated relay 610 have calls waiting, the circuit of relay 413 is opened and that relay releases.

In the controller-connector, when the first connector is operated to connect a link circuit with the link controller, relays 507, 513 and 512 operate in cascade as previously described. With relay 512 operated, an obvious circuit is closed for relay 517. Relay 517 remains operated in this circuit as long as the link controller is handling calls in the connected link circuit. Relay 517 in operating connects ground over its contact 1 and conductor 528 to the inner left armature of relay 610 so that, when this relay is operated, as above described, it locks under the control of relay 517 until the controller-connector is released.

Ground on conductor 528 or ground connected to other similar conductors by relay 517 extends to the locking circuits of other relays like relay 610 which are individual to other link circuits having access to this controller-connector to prevent these relays from releasing, to permit the operation of the relays like relay 600 in response to new calls, until all of the calls which have resulted in the operation of the relays like relay 600 have been served. A branch of the ground used for operating the calls-waiting relay 413 of the first controller-connector extends to the second controller-connector where it locks the relay like relay 517 if that relay is operated, while a branch of the operating circuit for the relay like relay 413 associated with the second controller-connector provides a locking circuit for relay 517 so that, if calls are waiting for either of these controller-connectors, relay 517 and the relay like relay 517 in the second controller-connector can not release until each of the other link circuits having waiting calls have been served at least once.

The chief function of relay 413 occurs during an all-senders busy condition. If an all-senders busy condition exists in connection with the link circuit shown, so that relay 400 is operated, the previously-traced circuit for operating relay 413 is opened, but relay 413 is operated in a circuit from battery through its upper winding, contact 4 of relay 400, conductor 657, contact 3 of relay 610, conductor 328, contact 3 of relay 309, contact 2 of relay 325, contact 6 of relay 305, conductor 516 to ground at contact 3 of relay 503. At this time relay 200 will be released, causing the operation of relays 205 and 206 as above described. Therefore relay 413 closes a circuit from ground over its contact 2, conductor 414, contact 6 of relay 206 to conductor 528 to provide a locking circuit for relay 610 when it is operated and a similar circuit for the corresponding relays of the other link circuits served by the busy group of senders.

With relay 400 operated, the locking circuit of relay 517 is opened and that relay is not held operated over the times that the associated controller-connector is released. However, when relay 200 reoperates at the end of a senders-busy condition it opens the circuit of relay 205 and that relay releases in turn releasing relay 206. However, relay 206 is slow to release and, during the interval following the release of relay 205 and prior to the release of relay 206, a circuit is closed from ground over contact 3 of relay 413, conductor 415, contact 2 of relay 205, contact 2 of relay 206, conductor 412, to battery through the winding of relay 517. Relay 517 operates in this circuit and locks over its contact 2 under the control in the second controller-connector, and resumes its function of locking out links that are served until all links with calls waiting have been served.

What is claimed is:

1. In a telephone system, trunk circuits, a plurality of register senders, link circuits for connecting said trunk circuits to said senders, a group of control circuits common to said link circuits for controlling the operation thereof, means for selectively connecting said link circuits with said control circuits, means responsive to the extension of a call to one of said link circuits to cause said link circuit to initiate the operation of said connecting means, means in each link circuit operated if all of said register senders are busy, and means under the control of said senders-busy-means to prevent said link circuits from initiating the operation of said connecting means in response to calls extended to said trunk circuits while said senders-busy-means is operated.

2. In a telephone system, trunk circuits, a plurality of register senders, a plurality of groups of link circuits for connecting said trunk circuits to said senders, control circuits common to said link circuits, means to selectively connect said link circuits with said control circuits, means responsive to the extension of a call to one of said link circuits to cause said link circuit to initiate the operation of said connecting means, means operated if all of said register senders are busy, means under the control of said senders-busy-means to prevent said link circuits from initiating the operation of said connecting means in response to calls extended to said trunk circuits while said senders-busy-means is operated, means operated in response to the connection of one link circuit with a control circuit to prevent the reoperation of the initiating means of said one link circuit while the connection-initiating-means of other link circuits in the same group are operated, and means under the control of said senders-busy-means for preventing the reoperation of the initiating-means of any link circuit while said senders-busy-means is operated and the connection-initiating-means of any other link circuit is operated.

3. In a telephone system a plurality of groups of trunk circuits, a link circuit common to each of said groups of trunk circuits, a plurality of register senders arranged in groups, a plurality of groups of switches, each group of switches serving to connect one group of trunks with one group of register senders, a plurality of controller circuits for controlling the operation of said switches, a plurality of connectors for connecting said link circuits with said controller circuits, each link circuit having access to a limited number of said connectors and each connector serving a plurality of said link circuits, a plurality of start relays for each link circuit, means under the control of said trunks for operating one of said start relays, a plurality of connector seizing relays for each link circuit, said connector seizing relays being individual to the connectors to which the link circuits have access, means under the control of any one of said start relays for normally completing a circuit for operating one of said connector seizing relays, means individual to each group of senders to indicate that all of the senders of said group are busy, and means in each link circuit controlled by said all-senders busy indicating means to prevent the completion of said seizing relay circuit.

4. In a telephone system a plurality of groups of trunk circuits, a link circuit common to each of said groups of trunk circuits, a plurality of register senders arranged in groups, a plurality of groups of switches, each group of switches serving to connect one group of trunks with one group of register senders, a plurality of controller circuits for controlling the operation of said switches, a plurality of connectors for connecting said link circuits with said controller circuits, each link circuit having access to a limited number of said connectors and each connector serving a plurality of said link circuits, a plurality of start relays for each link circuit, means under the control of said trunks for operating one of said start relays, a plurality of connector seizing relays for each link circuit, said connector seizing relays being individual to the connectors to which the link circuits have access, means under the control of any one of said start relays for normally completing a circuit for operating one of said connector seizing relays, means individual to each group of senders to indicate that all of the senders of said group are busy, an all-senders busy relay in each link circuit, means under the control of said all-senders busy indicating means to operate the all-senders busy relay in each link circuit served by the group of senders which is busy, and means under the control of said all-senders busy relay to prevent the completion of said seizing relay circuit.

5. In a telephone system a plurality of groups of trunk circuits, a link circuit common to each of said groups of trunk circuits, a plurality of register senders arranged in groups, a plurality of groups of switches, each group of switches serving to connect one group of trunks with one group of register senders, a plurality of controller circuits for controlling the operation of said switches, a plurality of connectors for connecting said link circuits with said controller circuits, each link circuit having access to a limited number of said connectors and each connector serving a plurality of said link circuits, a plurality of start relays for each link circuit, means under the control of said trunks for operating one of said start relays, a plurality of connector seizing relays for each link circuit, said connector seizing relays being individual to the connectors to which the link circuits have access, means under the control of any one of said start relays for normally completing a circuit for operating one of said connector seizing relays, means responsive to the operation of a connector seizing relay for operating said connector to connect an idle link controller with said link circuit, a lockout relay individual to each connector in each link circuit served by said connector, means responsive to the completion of a connection between a link circuit and a link controller by a connector to operate the lockout relay of said link circuit, means under the control of said lockout relay for preventing the completion of said seizing relay circuit, means individual to each group of senders to indicate that all of the senders of said group are busy and means under the control of said all-senders busy indicating means to prevent the release of the operated lockout relays in link circuits served by said group of senders.

6. In a telephone system a plurality of groups of trunk circuits, a link circuit common to each of said groups of trunk circuits, a plurality of register senders arranged in groups, a plurality of groups of switches, each group of switches serving to connect one group of trunks with one group of register senders, a plurality of controller circuits for controlling the operation of said switches, a plurality of connectors for connecting said link circuits with said controller circuits, each link circuit having access to a limited number of said connectors and each connector serving a plurality of said link circuits, a plurality of start relays for each link circuit, means under the control of said trunks for operating one of said start relays, a plurality of connector seizing relays for each link circuit, said connector seizing relays being individual to the connectors to which the link circuits have access, means under the control of anyone of said start relays for normally completing a circuit for operating one of said connector seizing relays, means responsive to the operation of a connector seizing relay for operating said connector to connect an idle link controller with said link circuit, a lockout relay individual to each connector in each link circuit served by said connector, means responsive to the completion of a connection between a link circuit and a link controller by a connector to operate the lockout relay of said link circuit, means under the control of said lockout relay for preventing the completion of said seizing relay circuit, means individual to each group of senders to indicate when all of the senders of said group are busy, means for indicating when said link circuits are waiting for a connector and means under the joint control of said all-senders busy indicating means and said waiting call indicating means to prevent the release of operated lockout relays in sender links served by said group of senders and by said connector.

7. In a telephone system a plurality of groups of trunk circuits, a link circuit common to each of said groups of trunk circuits, a plurality of register senders arranged in groups, a plurality of groups of switches, each group of switches serving to connect one group of trunks with one group of register senders, a plurality of controller circuits for controlling the operation of said switches, a plurality of connectors for connecting said link circuits with said controller circuits, each link circuit having access to a limited number of said connectors and each connector serving a plurality of said link circuits, a plurality of start relays for each link circuit, means under the control of said trunks for operating one of said start relays, a plurality of connector seizing relays for each link circuit, said connector seizing relays being individual to the connectors to which the link circuits have access, means under the control of any one of said start relays for normally completing a circuit for operating one of said connector seizing relays, means responsive to the operation of a connector seizing relay for operating said connector to connect an idle link controller with said link circuit, a lockout relay individual to each connector in each link circuit served by said connector, means responsive to the completion of a connection between a link circuit and a link controller by a connector to operate the lockout relay of said link circuit, means under the control of said lockout relay for preventing the completion of said seizing relay circuit, means individual to each group of senders to indicate that all of the senders of said groups are busy, means for indicating that said link circuits are waiting for a connector, means under the control of an operated start relay for operating said waiting link indicating means and means under the joint control of said all-senders busy indicating means and said waiting link indicating means to prevent the release of operated lockout relays in sender links served by said group of senders and by said connector.

References Cited in the file of this patent

UNITED STATES PATENTS

| | | |
|---|---|---|
| 2,668,195 | Brewer | Feb. 2, 1954 |
| 2,674,657 | Bellamy | Apr. 6, 1954 |